United States Patent
Ino et al.

(10) Patent No.: US 8,274,695 B2
(45) Date of Patent: Sep. 25, 2012

(54) IMAGE PROCESSING APPARATUS AND DROPLET EJECTION APPARATUS

(75) Inventors: Naosuke Ino, Ebina (JP); Daisuke Tatsumi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1638 days.

(21) Appl. No.: 11/701,267

(22) Filed: Feb. 1, 2007

(65) Prior Publication Data

US 2008/0055347 A1 Mar. 6, 2008

(30) Foreign Application Priority Data

Aug. 30, 2006 (JP) ................. 2006-233827

(51) Int. Cl.
*G06K 15/10* (2006.01)

(52) U.S. Cl. ........ 358/1.8; 358/1.1; 358/1.14; 358/1.13; 347/9; 347/5; 347/1

(58) Field of Classification Search .............. 347/9, 5, 347/1; 358/1.1–1.18
See application file for complete search history.

(56) References Cited

U.S. PATENT DOCUMENTS

| | | | |
|---|---|---|---|
| 6,580,822 B1 * | 6/2003 | Takei | 382/162 |
| 6,585,363 B1 * | 7/2003 | Tanaka et al. | 347/96 |
| 6,629,743 B2 * | 10/2003 | Chikuma et al. | 347/15 |
| 2001/0021042 A1 * | 9/2001 | Hirota et al. | 358/505 |
| 2001/0030670 A1 * | 10/2001 | Kikuchi et al. | 347/15 |
| 2002/0196303 A1 * | 12/2002 | Koitabashi et al. | 347/21 |
| 2005/0212835 A1 * | 9/2005 | Konno | 347/6 |

FOREIGN PATENT DOCUMENTS

| | | |
|---|---|---|
| JP | 2002-331741 | 11/2002 |
| JP | 2000-190480 | 11/2004 |

OTHER PUBLICATIONS

Koitabashi et al., Ink Print Method and Ink-Printing Apparatus, Jul. 11, 2000, JP 2000190480.*

* cited by examiner

*Primary Examiner* — Benny Q Tieu
*Assistant Examiner* — Martin Mushambo
(74) *Attorney, Agent, or Firm* — Fildes & Outland, P.C.

(57) ABSTRACT

An image processing apparatus has a determining unit that determines based on a print job whether an image is to be recorded by ejecting a treatment liquid, a generating unit that based on image data generates print data by converting portions of each of the color data that are capable of being replaced by using black ink droplets into black data at a predetermined ratio, and a ratio setting unit that sets the ratio of the generating unit when the determining unit determines that the image is to be recorded by ejecting the treatment liquid so that the ratio is higher than that in other cases.

14 Claims, 5 Drawing Sheets

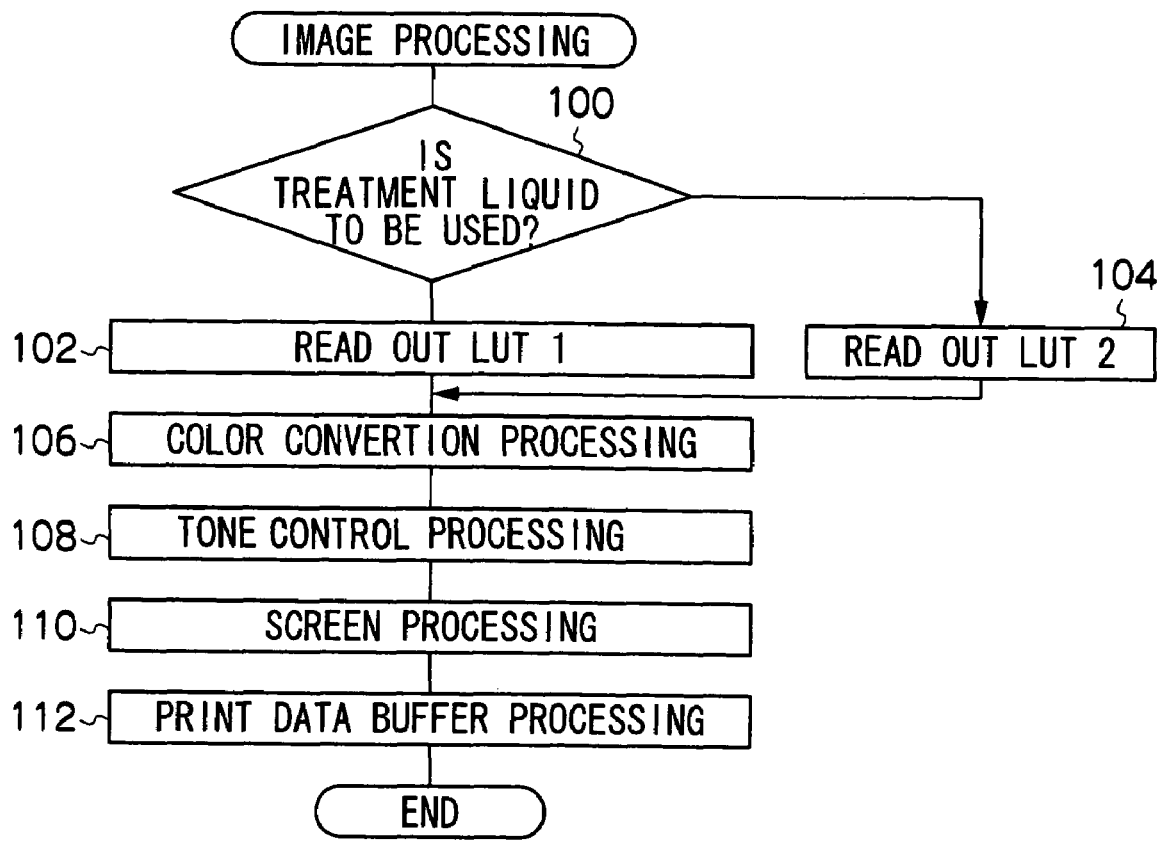

IMAGE PROCESSING APPARATUS AND DROPLET EJECTION APPARATUS

CROSS-REFERENCE TO RELATED APPLICATION

This application claims priority under 35 USC 119 from Japanese Patent Application No. 2006-233827.

BACKGROUND

1. Technical Field

The present invention relates to image processing apparatuses and droplet ejection apparatuses.

2. Related Art

In ink jet printers that form images using recording heads for ejecting ink droplets from nozzles, the recording heads are driven according to image data, and ink droplets are ejected onto recording media so that images are formed.

In recent years, in such kinds of ink jet printers, reactive two-component ink is developed. Ink and treatment liquid treatment liquid are ejected onto recording media, and the ink and the treatment liquid are reacted on the recording media. As a result, colorant aggregate, so that spread of the color materials is repressed.

In the image formation using a treatment liquid, however, since the ink liquid and the treatment liquid are ejected onto recording paper, in the case where printing is carried out particularly on plain paper, the quantity of solvent is too large with respect to the paper, so that it is likely that the paper is easily curled or show through occurs with the paper.

Conventionally, it has been proposed that it is selected whether the treatment liquid is or is not ejected according to the print mode and type of paper.

Further, conventionally, an achromatic portion of an image being printed can be expressed by a liquid composition and plural chromatic inks, namely, the achromatic portion can be expressed by plural chromatic inks. The opposite is also proposed that a portion where predetermined chromatic colors are combined can be expressed by achromatic ink.

SUMMARY

The invention provides an image processing apparatus and a droplet ejection apparatus that can prevent curl and show through from the back of the paper without deteriorating image quality.

One aspect of the invention provides an image processing apparatus that can eject ink droplets with plural colors including black based on image data included in a print job, and generates print data for a driving recording head that can eject a treatment liquid corresponding to the ink droplets for aggregating color materials in the ink droplets, the apparatus including: a determining unit that determines whether an image is to be recorded by ejecting the treatment liquid based on the print job; a generating unit that generates print data by converting portions of each of the respective color data that are capable of being replaced by using black ink droplets into black data at a predetermined ratio based on the image data; and a ratio setting unit that sets the ratio by means of the generating unit when the determining unit determines that the image is to be recorded by ejecting the treatment liquid so that the ratio is higher than that in other cases.

Other aspects, features and advantages of the present invention will become apparent from the following description taken in conjunction with the accompanying drawings.

BRIEF DESCRIPTION OF THE DRAWINGS

Exemplary embodiments of the present invention will be described in detail based on the following figures, in which:

FIG. 4 is a flowchart illustrating a flow of image processing that is executed in the image forming apparatus according to the embodiment;

DETAILED DESCRIPTION

An exemplary embodiment of the invention will be described below with reference to the drawings.

Figure 1:
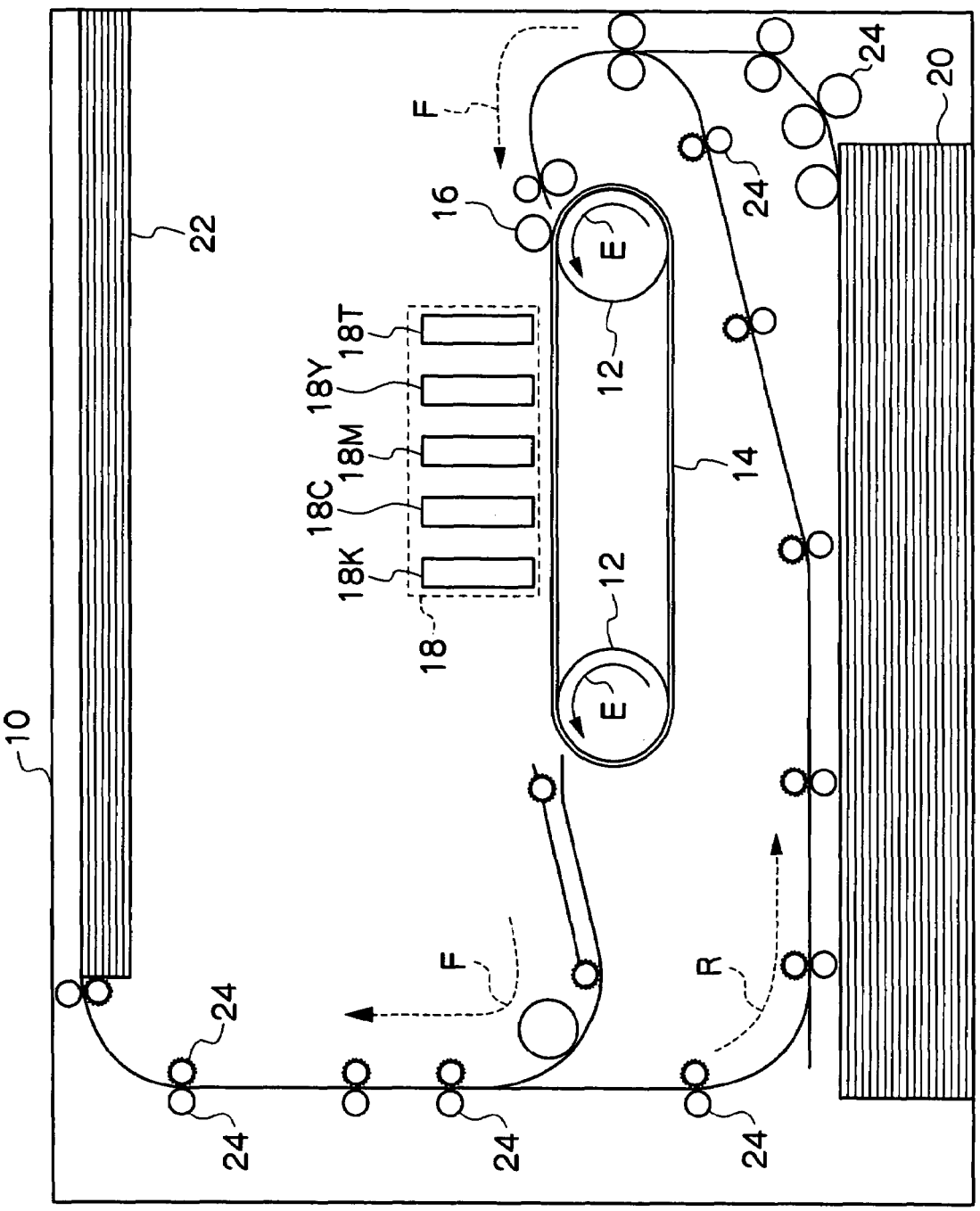
FIG. 1 is a schematic view illustrating a structure of an image forming apparatus according to an exemplary embodiment of the present invention.

FIG. 1 schematically illustrates a structure of an image forming apparatus 10 according to the exemplary embodiment. As shown in FIG. 1, the image forming apparatus 10 includes a paper feed tray 20, a catch tray 22, and plural rollers 24.

The paper feed tray 20 accommodates recording paper therein. Sheets of the recording paper in the paper feed tray 20 are fed out one by one by the rollers 24, and while they are being conveyed along a predetermined conveyance path F in the image forming apparatus 10, images are recorded by recording heads 18, mentioned later, then the paper is discharged onto the catch tray 22.

Along the recording paper conveyance path F are provided: an endless belt 14 that is entrained around feed rolls 12, each of which being rotated in a direction of an arrow E; and an attaching unit 16. The attaching unit 16 presses the recording paper conveyed on the conveyance path F against the endless belt 14 and imparts electric charges to the recording paper, thereby causing the recording paper to be attached to the endless belt 14.

Five recording heads 18T, 18Y, 18M, 18C and 18K are disposed at positions of the recording paper conveyance path F which are in opposing relationship to the recording paper attached to the endless belt 14. The recording heads eject a treatment liquid (T) and inks of four colors including Yellow (Y), magenta (M), cyan (C) and black (K), respectively.

The recording heads 18T, 18Y, 18M, 18C and 18K are FWA (Full Width Array) type recording heads in which head units include plural ejection nozzles and are arranged over an entire widthwise direction area of the endless belt 14.

Components provided for the respective colors are designated by reference numerals with alphabetical characters (Y/M/C/K), which indicate the respective colors, added at the ends thereof. However, when color discrimination is not particularly referred to, explanation will be made with the alphabetical characters omitted from the ends of the reference numerals. Reference numerals with the alphabetical character T added at the end thereof designate components for ejecting the treatment liquid.

As shown in FIG. 1, the image forming apparatus 10 according to the present exemplary embodiment includes a conveyance path R for duplex. When double-side printing is performed, after having an image formed on one surface, the recording paper is conveyed along the conveyance path R so that front and rear sides thereof can be reversed in such a manner that the rear side relative to the surface formed with the image opposes the recording heads 18T, 18Y, 18M, 18C and 18K.

Figure 2:
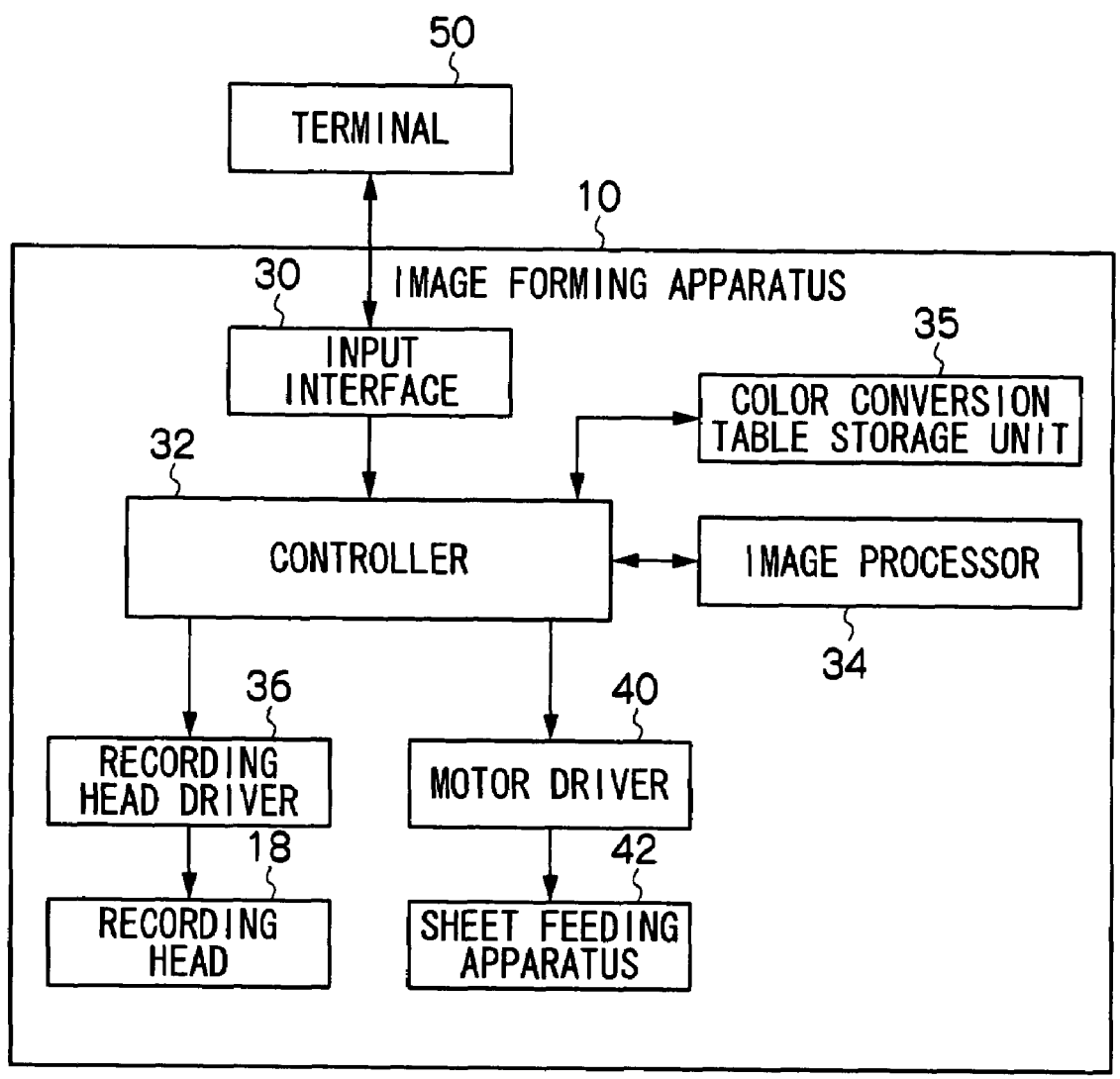
FIG. 2 is a block diagram illustrating a structure of an electric system of the image forming apparatus according to the exemplary embodiment.

FIG. 2 schematically illustrates a structure of an electrical system of the image forming apparatus 10 according to the present exemplary embodiment. As shown in FIG. 2, the image forming apparatus 10 includes an input interface 30, a controller 32, an image processor 34, a color conversion table storage unit 35, a recording head driver 36 and a motor driver 40. The input interface 30, the image processor 34, the color conversion table storage unit 35, the recording head driver 36 and the motor driver 40 are connected to the controller 32.

As shown in FIG. 2, the image forming apparatus 10 is connected to a terminal 50 such as an external personal computer or the like.

The input interface 30 acquires a print job through communication with the terminal 50 and outputs the print job to the controller 32. The controller 32 controls the respective portions according to the input print job, so that image formation based on image data is executed.

The print job includes print conditions, such as print copies, types of sheets and double-side printing, image data and the like.

The image processor 34 executes various types of image processing according to the print conditions such as color converting processing for converting image data of RGB input from the terminal 50 into image data of YMCK, tone control processing, screen processing and print data buffer processing.

Two kinds of color conversion tables which are used for the color converting processing in the image processor 34 are stored in the color conversion table storage unit 35.

The recording head drivers 36 are provided for the recording heads 18T, 18Y, 18M, 18C and d18K, respectively, and they are connected to the corresponding recording heads 18. The recording head driver 36 generates driving electric power according to the ejection timing and the ejection amount of an ink droplet or a treatment liquid from each of the nozzles composing the recording heads 18, and outputs the driving power to the recording heads 18.

The motor driver 40 is connected to a sheet conveyance unit 42, and drives the respective members including the feed rolls 12 and plural rolls 24 so as to convey the sheets along the conveyance paths F and R.

The controller 32 reads, according to the print conditions, a LUT (Look Up Table) stored in the color conversion table storage unit 35, and instructs the image processor 34 to execute the image processing according to the print conditions.

The controller 32 operates the motor driver 40 to drive the sheet conveyance unit 42 so as to control the conveyance of the recording paper.

The controller 32 operates the recording head driver 36 with the print data buffered by the various types of image processing by the image processor 34 according to the timing at which the conveyance unit 42 conveys the recording paper to the ink droplet ejection position.

When color conversion is performed, the image processor 34 generates K for a minimum value of YMC on the basis of the YMC image data, and carries out UCR (under color removal) so as to convert to image data of YMCK.

Figure 3:
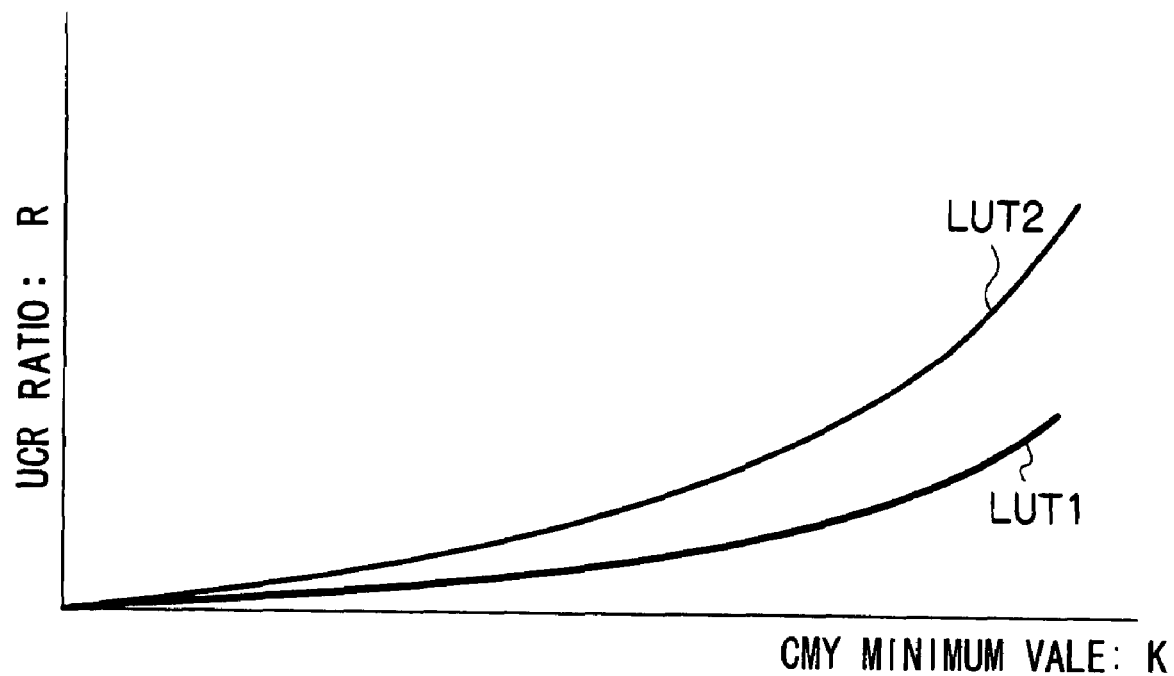
FIG. 3 is a graph illustrating characteristics of two kinds of look up table to be used for color conversion according to the embodiment.

FIG. 3 illustrates a relationship between the minimum value YMC:K and the UCR ratio R for two types of LUTs stored in the color conversion table storage unit 35 according to the present exemplary embodiment. As shown in FIG. 3, the respective LUTs have different UCR ratios R which show the percentage of the minimum value of YMC that is to be replaced by the K color.

When the print conditions are those in which it is specified that no treatment liquid is to be used, the controller 32 selects a low UCR ratio R which converts image data of RGB into image data of YMCK with the LUT 1. When the print conditions are those in which the treatment liquid is specified to be used, the controller 32 selects a high UCR ratio R which converts image data of RGB into image data of YMCKT with the LUT 2.

That is to say, in this exemplary embodiment, by the use of the LUT 1 or the LUT 2, not only the color space for conversion processing from RGB into YMCK but also the UCR process and the process for creating print data of the treatment liquid are executed at the same time.

The operation of the present exemplary embodiment will be explained below.

When the print job of the image data of RGB is input from the external terminal 50, the image forming apparatus 10 starts the image forming process.

First, at step 100, it is determined whether it is a mode in which the treatment liquid is used, based on the print conditions included in the print job at step 100. When the determination is NO, the sequence goes to step 102, where the LUT 1 is read out from the color conversion table storage unit 35 and outputs LUT 1 to the image processor 34. The sequence then goes to step 106.

On the other hand, when the determination is YES at step 100, the sequence goes to step 104, and the LUT 2 is read from the color conversion table storage unit 35 to be output to the image processor 34. The sequence then goes to step 106.

In this exemplary embodiment, when the print conditions are such that the type of sheet to be used is plain paper, colorant included in the ink are aggregated by using the treatment liquid, and when coated paper is to be used, the treatment liquid is not used.

At step 106, the color converting process for converting the image data of RGB into image data of YMCK is executed using the read out LUT. Thus, when the image is formed without using the treatment liquid, the color converting process is executed through use of the LUT 1 whose UCR ratio R is low. When the image is formed using the treatment liquid, the color converting process is executed through use of the LUT 2 whose UCR ratio R is high.

Figure 5A:
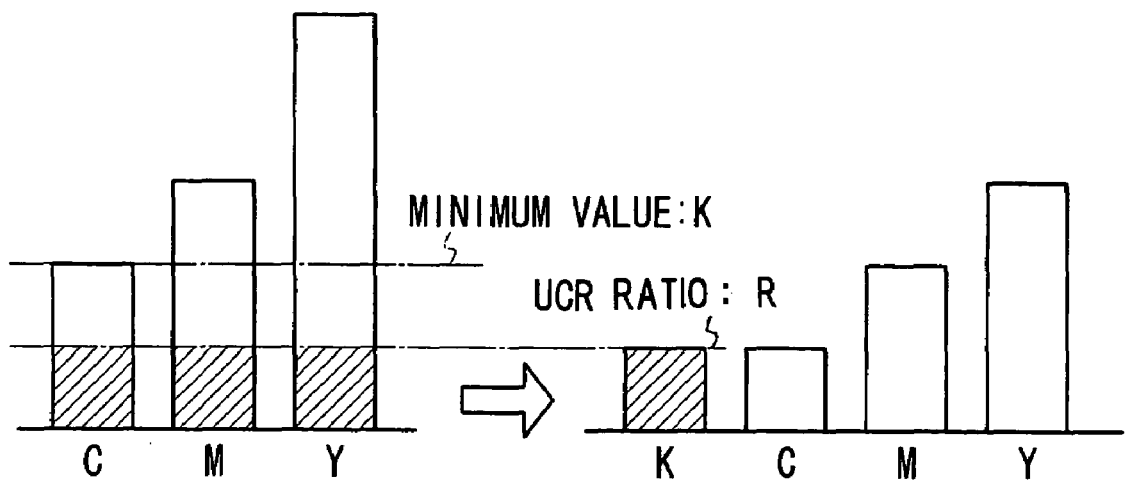
FIG. 5A is an explanatory diagram of a total quantity of ink in a UCR process using LUT 1 according to the embodiment.
Figure 5B:
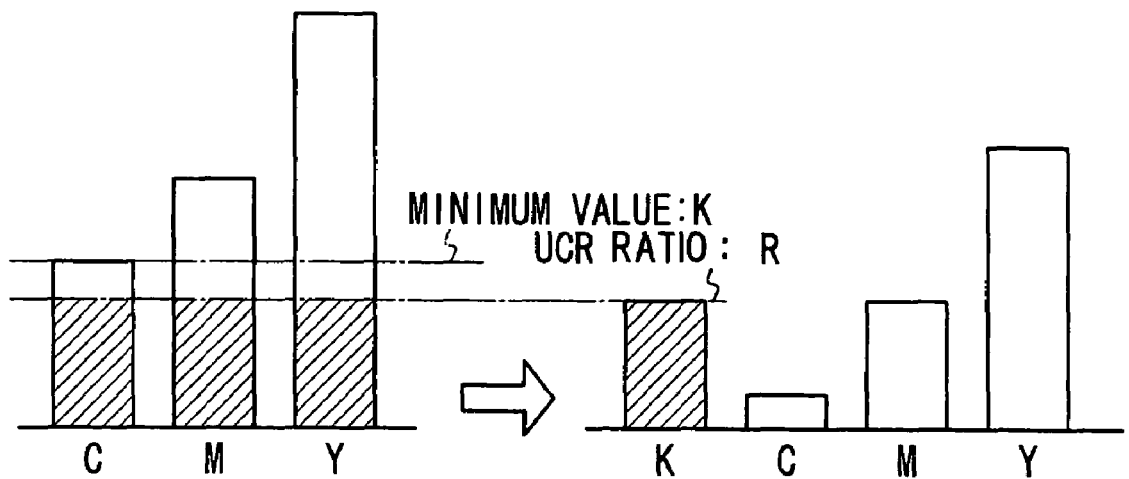
FIG. 5B is an explanatory diagram of a total quantity of ink in an UCR process where a color converting process is executed by using LUT 2.

FIG. 5A illustrates the total quantity of the ink for a case where the color conversion is carried out using the LUT 1, and FIG. 5B illustrates the total quantity of the ink for a case where the color conversion is carried out using the LUT 2. In FIGS. 5A and 5B, heights of bars corresponding to the letters of the respective colors show the ink quantity of the respective colors.

As described above, since the UCR ratio R of the LUT 2 is higher than the UCR ratio R of the LUT 1 (see FIG. 3), as shown in FIGS. 5A and 5B, the total quantity of the YMCK inks for the case where the color conversion is executed using the LUT 2 is smaller than the total quantity of the YMCK inks for the case where no treatment liquid is used.

At next step 108, the image data, which have been converted into the image data of YMCK by the color converting process and subjected to the UCR process, are subjected to tone control processing. That is to say, the tone characteristics are corrected for respective colors. At step 110, screen processing is executed so that page images are created for each page, and the sequence goes to step 112.

At step 112, print data based on the image data of YMCK for each page are buffered, and this image processing is ended.

The recording head drivers 36 are operated according to the print data buffered by the image processing so as to drive the driving heads 18, and images are formed on the paper.

As described above, the present exemplary embodiment is structured such that ink droplets of Y, M, C and K can be ejected based on the image data included in the print job together with being structured such that, when generating the print data for driving recording heads 18 enabled for ejection of an ink droplet color material aggregating treatment liquid T corresponding to the ink droplets, the controller 32 determines whether to record the image by ejecting the treatment liquid based on the print job, and being structured such that the image processor 34 generates the print data obtained by converting color data for portions of each the color capable of being replaced by using black ink droplets into black data at a predetermined UCR ratio based on the image data. The controller 32 sets the UCR ratio when the determination is made that the image is to be recorded by ejecting the treatment liquid so that the UCR ratio is higher than that of other cases. For this reason, curl and print being seen through from the back of sheets can be prevented without deteriorating the image quality.

That is to say, when the UCR ratio is made to be higher, generally chromatic saturation tends to be reduced, but since the UCR ratio is set to be higher when images are formed by using the treatment liquid in the present exemplary embodiment, the image quality is not deteriorated due to the effect that chromatic saturation is improved by the treatment liquid.

Further, according to the present exemplary embodiment, since one of the LUT 1 or the LUT 2 that have different UCR ratios is selected according to the result of determination as to whether to use the treatment liquid, curl and print being seen through from the back of sheets can be prevented without deteriorating the image quality.

Although, in the present exemplary embodiment, description has been made of a form in which it is determined whether to record images by ejecting the treatment liquid according to the type of the sheets (recording media) on which the images are to be formed, the present invention is not limited thereto.

For example, when images are to be formed on both sides of sheets (recording media), determination may be made that images are to be recorded by ejecting the treatment liquid in order to prevent the print being seen through from the back. When an image is formed on a single side, the determination may be made that the image is recorded without ejecting the treatment liquid.

Further, since it is preferable that an image be formed with the emphasis on the chromatic saturation when an image to be formed is photographic, it may be that the treatment liquid is not used, but when characters are formed, it is preferable that an image is formed with the emphasis on edges, and thus the treatment liquid may be used.

Determination may also be made as to whether the treatment liquid is used according to a suitable combination of the above.

The structure of the image forming apparatus 10 according to the exemplary embodiment (see FIGS. 1 and 2) is but one example, and suitable changes may be made without departing from the gist of the invention.

The process flow according to the exemplary embodiment (see FIGS. 3 to 5) is also but one example, and it goes without saying that the process flow can be suitably changed without departing from the gist of the invention.

This exemplary embodiment explains a form where data relating to the UCR processing and the treatment liquid data generating processing are added in the color conversion table, but the invention is not limited to this. After the color space conversion from RGB into YMCK is carried out, the UCR process and the treatment liquid print data creating process can be individually executed.

In this case, the following method can be used. That is to say, in this method, the conversion from a RGB space into a CMY space is carried out by a matrix operation, and then a function according to the presence/non-presence of the treatment liquid (a function of the characteristics shown in FIG. 3) is calculated, and the minimum value of YMC is calculated by the image processor.

While the present invention has been illustrated and described with respect to specific exemplary embodiments thereof, it is to be understood that the present invention is by no means limited thereto and encompasses all changes and modifications which will become without departing from the spirit and scope of the invention.

What is claimed is:

1. An image processing apparatus that generates print data based on image data included in a print job for a driving recording head that can eject ink droplets with a plurality of colors including black, and that can eject a treatment liquid corresponding to the ink droplets for aggregating color materials in the ink droplets, the apparatus comprising:
   a determining unit that determines whether an image is to be recorded by one of ejecting the treatment liquid based on the print job and ejecting the treatment liquid when the image is to be formed on both sides of a recording medium;
   a generating unit that generates print data by converting portions of each of the color data that are capable of being replaced by using black ink droplets into black data at a predetermined ratio based on the image data;
   the generating unit generating the print data using one of two or more color conversion tables, the ratios of which are different from each other; and
   a ratio setting unit that sets the ratio of the generating unit when the determining unit determines that the image is to be recorded by ejecting the treatment liquid so that the ratio is higher than that in other cases;
   the ratio setting unit selecting the color conversion table according to the result determined by the determining unit.

2. The image processing apparatus of claim 1, wherein the determining unit determines according to a recording medium on which the image is to be formed whether the image is to be recorded by ejecting the treatment liquid.

3. The image processing apparatus of claim 2, wherein the plurality of colors include black, cyan, magenta and yellow.

4. The image processing apparatus of claim 1, wherein the determining unit determines according to a recording medium on which the image is formed whether the image is to be recorded by ejecting the treatment liquid.

5. The image processing apparatus of claim 1, wherein the determining unit determines that the image is to be recorded by ejecting the treatment liquid when the image is to be formed on both sides of a recording medium.

6. The image processing apparatus of claim 5, wherein the plurality of colors include black, cyan, magenta and yellow.

7. The image processing apparatus of claim 1, wherein the plurality of colors include black, cyan, magenta and yellow.

8. A droplet ejection apparatus which can eject ink droplets with a plurality of colors including black based on image data included in a print job and has a droplet ejection head that can eject a treatment liquid corresponding to the ink droplets for aggregating color materials in the ink droplets, the apparatus comprising:

- a determining unit that determines whether an image is to be recorded by one of ejecting the treatment liquid based on the print job and ejecting the treatment liquid when the image is to be formed on both sides of the recording medium;
- a generating unit that generates print data by converting portions of each of the color data that are capable of being replaced by using black ink droplets into black data at a predetermined ratio based on the image data;
- the generating unit generating the print data using one of two or more color conversion tables, the ratios of which are different from each other;
- a ratio setting unit that sets the ratio of the generating unit when the determining unit determines that the image is to be recorded by ejecting the treatment liquid so that the ratio is higher than that in other cases;
- the ratio setting unit selecting the color conversion table according to the result determined by the determining unit; and
- a driving unit that drives the droplet ejection head based on the print data generated by the generating unit.

9. The droplet ejection apparatus of claim 8, wherein the determining unit determines according to a recording medium on which the image is to be formed whether the image is to be recorded by ejecting the treatment liquid.

10. The droplet ejection apparatus of claim 9, wherein the plurality of colors include black, cyan, magenta and yellow.

11. The droplet ejection apparatus of claim 8, wherein the determining unit determines according to a recording medium on which the image is to be formed whether the image is to be recorded by ejecting the treatment liquid.

12. The droplet ejection apparatus of claim 8, wherein the determining unit determines that the image is to be recorded by ejecting the treatment liquid when the image is to be formed on both sides of the recording medium.

13. The droplet ejection apparatus of claim 12, wherein the plurality colors include black, cyan, magenta and yellow.

14. The droplet ejection apparatus of claim 8, wherein the plurality of colors include black, cyan, magenta and yellow.

* * * * *